United States Patent
Endo

Patent Number: 5,189,469
Date of Patent: Feb. 23, 1993

[54] RECORDING DEVICE

[75] Inventor: Yuji Endo, Amagasaki, Japan

[73] Assignee: Mitsubishi Denki Kabushiki Kaisha, Tokyo, Japan

[21] Appl. No.: 836,415

[22] Filed: Feb. 18, 1992

[30] Foreign Application Priority Data

Feb. 18, 1991 [JP] Japan .................................. 3-23088

[51] Int. Cl.$^5$ ............................................ G03G 15/14
[52] U.S. Cl. .................................... 355/200; 271/226; 355/271; 355/309
[58] Field of Search .............. 355/200, 271, 274, 277, 355/309, 308, 317, 281, 316, 321; 271/226, 227, 275, 160

[56] References Cited

U.S. PATENT DOCUMENTS

| | | | |
|---|---|---|---|
| 4,544,262 | 10/1985 | Kanemitsu et al. | 355/271 X |
| 4,809,033 | 2/1989 | Ikemoto et al. | 355/271 X |
| 4,896,191 | 1/1990 | Ohyabu et al. | 355/309 |
| 4,905,048 | 2/1990 | Suzuki | 355/271 |
| 4,965,640 | 10/1990 | Watarai et al. | 355/283 |

FOREIGN PATENT DOCUMENTS 0307942 9/1988 European Pat. Off. .
52378 10/1988 Japan .

Primary Examiner—A. T. Grimley
Assistant Examiner—T. A. Dang
Attorney, Agent, or Firm—Rothwell, Figg, Ernst & Kurz

[57] ABSTRACT

In a recording device, such as a facsimile machine, has a lower cover and an upper cover pivotable with respect to the lower cover for opening and closing, a photosensitive drum mounted to the upper cover, and a paper guide assembly through which recording paper is guided, support rollers rotatably mounted on the paper guide assembly such that they are engageable with the ends of the photosensitive drum, a transfer charger is movable together with the paper guide assembly, and a spring resiliently presses the transfer charger toward the photosensitive drum. When the upper cover is closed, the photosensitive drum is caused to abut on the support rollers, and the relative position between the paper guide assembly, the photosensitive drum, and the transfer charger is thereby maintained constant.

8 Claims, 6 Drawing Sheets

RECORDING DEVICE

BACKGROUND OF THE INVENTION

1. Field of the Invention

The present invention relates to a recording device, such as a facsimile machine utilizing electrophotography, and in particular to a mechanism for accurately positioning a transfer charger with respect to a photosensitive drum.

2. Prior Art

A conventional electrophotographic recording device is provided with a housing comprised of a lower cover and an upper cover pivotable with respect to the lower cover for opening and closing, a photosensitive drum mounted to the upper cover, and a transfer charger mounted to the lower cover. A pair of guide plates are provided to guide recording paper to the gap between the photosensitive drum and the transfer charger. The guide plates are mounted to the lower cover.

The gap between the cylindrical surface of the photosensitive drum and the transfer charger must be accurately adjusted in order to achieve a satisfactory transfer of the toner image and obtain a picture (printout) of good quality. For instance, the gap is about 1 to 2 mm and the permissible error is ±0.1 mm. But this is difficult because the upper cover and the lower cover to which the photosensitive drum and the transfer charger are respectively mounted are assembled such that they are movable for opening and closing. Moreover, the exit part of the guide plates must be aligned with the gap between the photosensitive drum and the transfer charger in order to avoid paper jamming. But this again requires delicate and time-consuming adjustment. Providing a mechanism for the accurate positioning of these components may unacceptably increase the cost of the recording device.

SUMMARY OF THE INVENTION

The invention aims at solving the above problems, and its object is to provide a recording device in which the gap between the cylindrical surface of the photosensitive drum and the transfer charger is maintained constant, alignment between the guide plates and the gap between the photosensitive drum and the transfer charger is ensured with ease, and which is also inexpensive.

A recording device according to the invention comprises:

a housing comprised of a lower cover and an upper cover pivotable with respect to the lower cover for opening to permit access to the interior of the housing, and closing to prevent access to the interior of the housing;

a photosensitive drum mounted to the upper cover;

a transfer charger being mounted to the lower cover;

a paper guide assembly having one part adjacent the transfer section and guiding the recording paper to the transfer section;

support rollers rotatably mounted on the one part of the paper guide assembly so as to be engageable with axial ends of the photosensitive drum;

the transfer charger being movable together with the paper guide assembly; and means for resiliently pressing the transfer charger toward a photosensitive drum;

whereby when the upper cover is closed the photosensitive drum is caused to abut on the support rollers, and the gap between the cylindrical surface of the photosensitive drum and the transfer charger is determined by abutment of the support rollers on the circumferential surface of the photosensitive drum.

In the invention, by the action of the support rollers with which the cylindrical surface of the photosensitive drum is brought into contact, the gap between the cylindrical surface of the photosensitive drum and the transfer charger is maintained constant. Moreover, because the relative position between the paper guide assembly and the transfer charger is maintained constant, alignment between the exit part of the paper guide assembly and the gap between the photosensitive drum and the transfer charger is ensured. As a result, a satisfactory toner image transfer is achieved, and paper jamming is avoided.

DETAILED DESCRIPTION OF THE PREFERRED EMBODIMENTS

Figure 1:
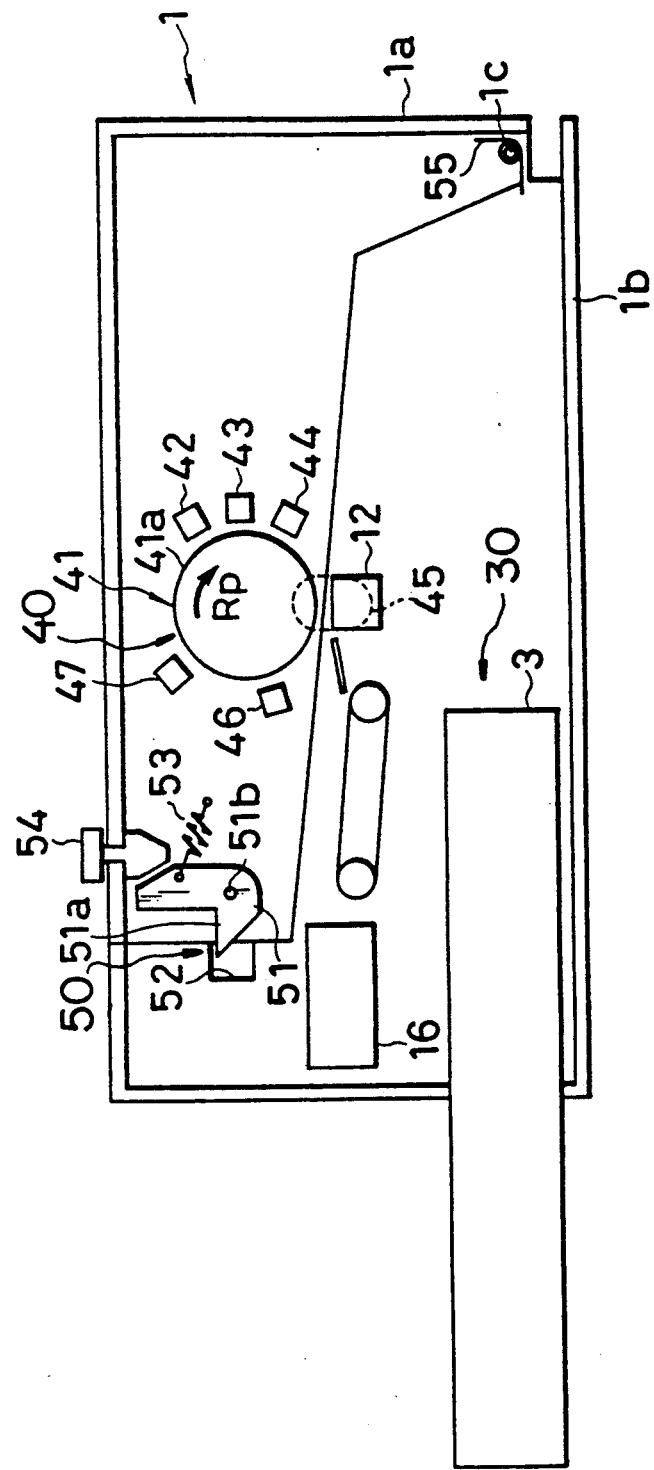
FIG. 1 is a schematic sectional view of a recording device of the invention, in the state in which it is closed.

An embodiment of the invention will now be described with reference to FIG. 1 to FIG. 6.

The recording device of the illustrated embodiment is a facsimile machine, and comprises an electrophotography system 40, and a paper feed system 30, which are accommodated in or attached to a housing formed of an upper cover 1a and a lower cover 1b. The housing can be opened and closed by rotating the upper cover 1a relative to the lower cover 1b about a shaft 1c. Some of the components are attached to the upper cover 1a while others are attached to the lower cover 1b.

Figure 2:
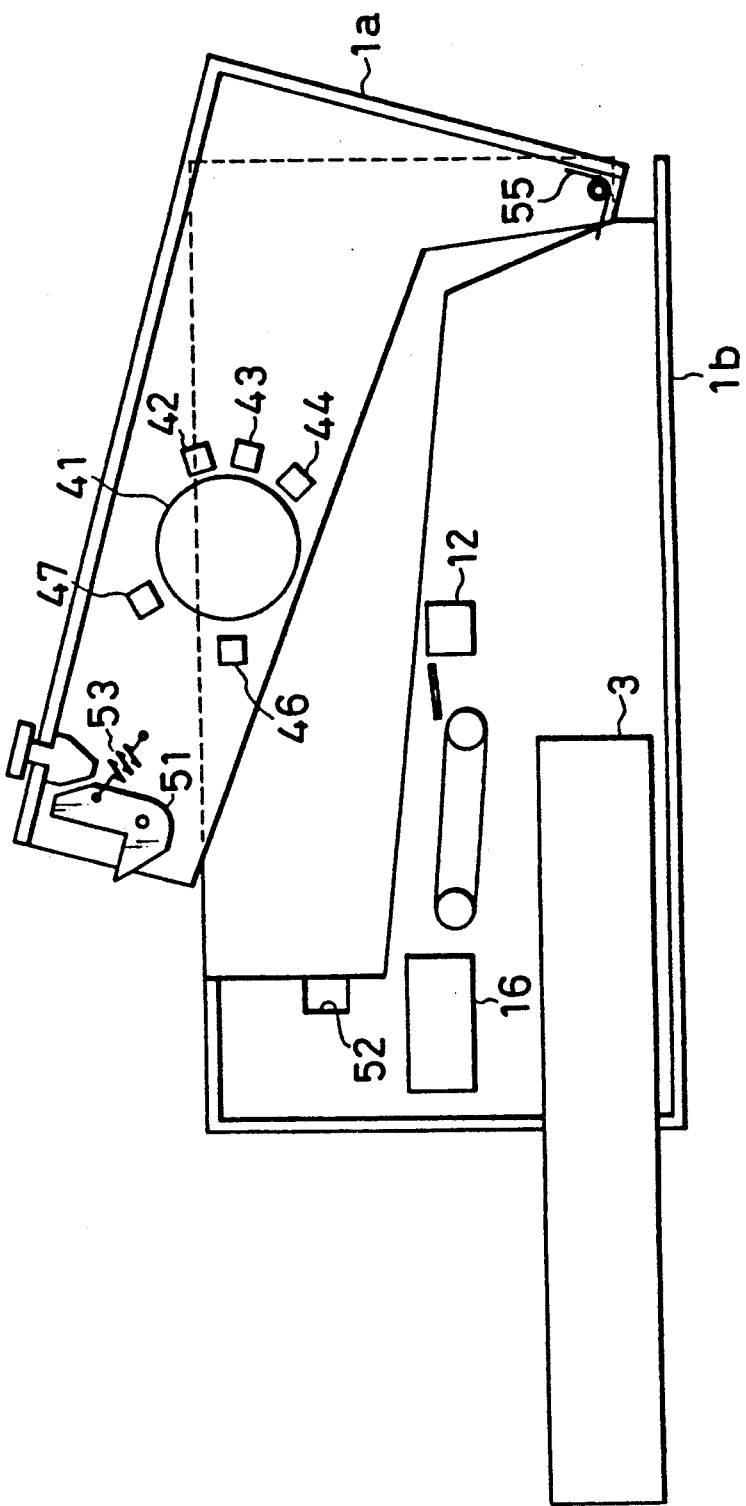
FIG. 2 is a schematic sectional view of a recording device of the invention, in the state in which it is opened.
Figure 3:
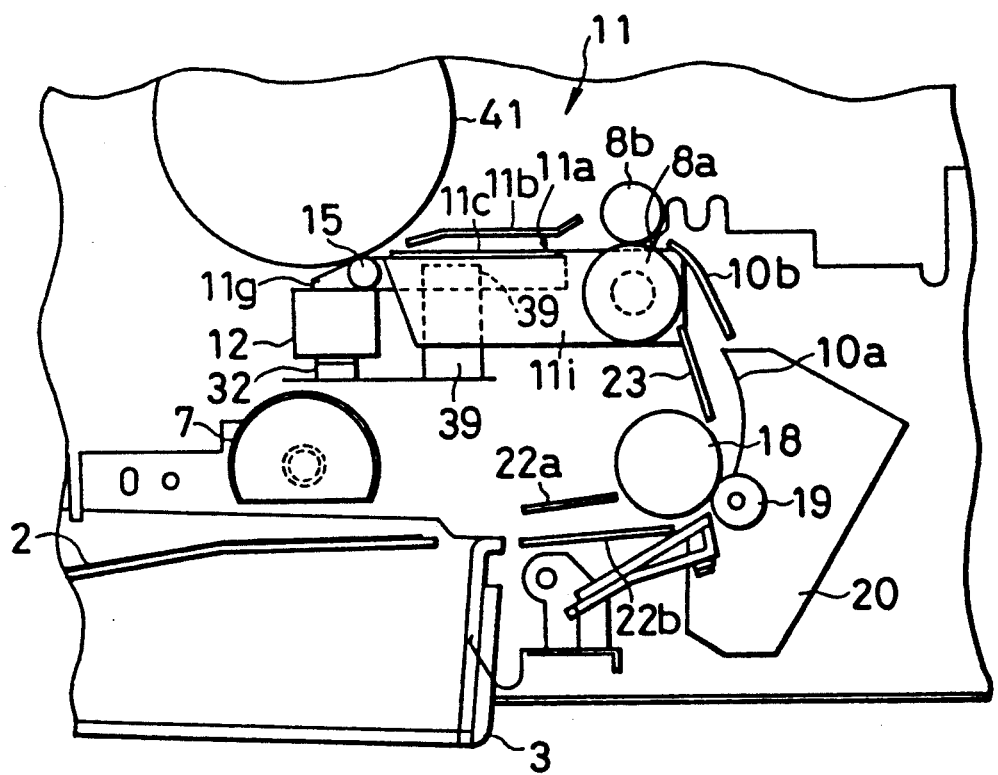
FIG. 3 is a sectional view showing a pertient part of the recording device of an embodiment of the invention.
Figure 4:
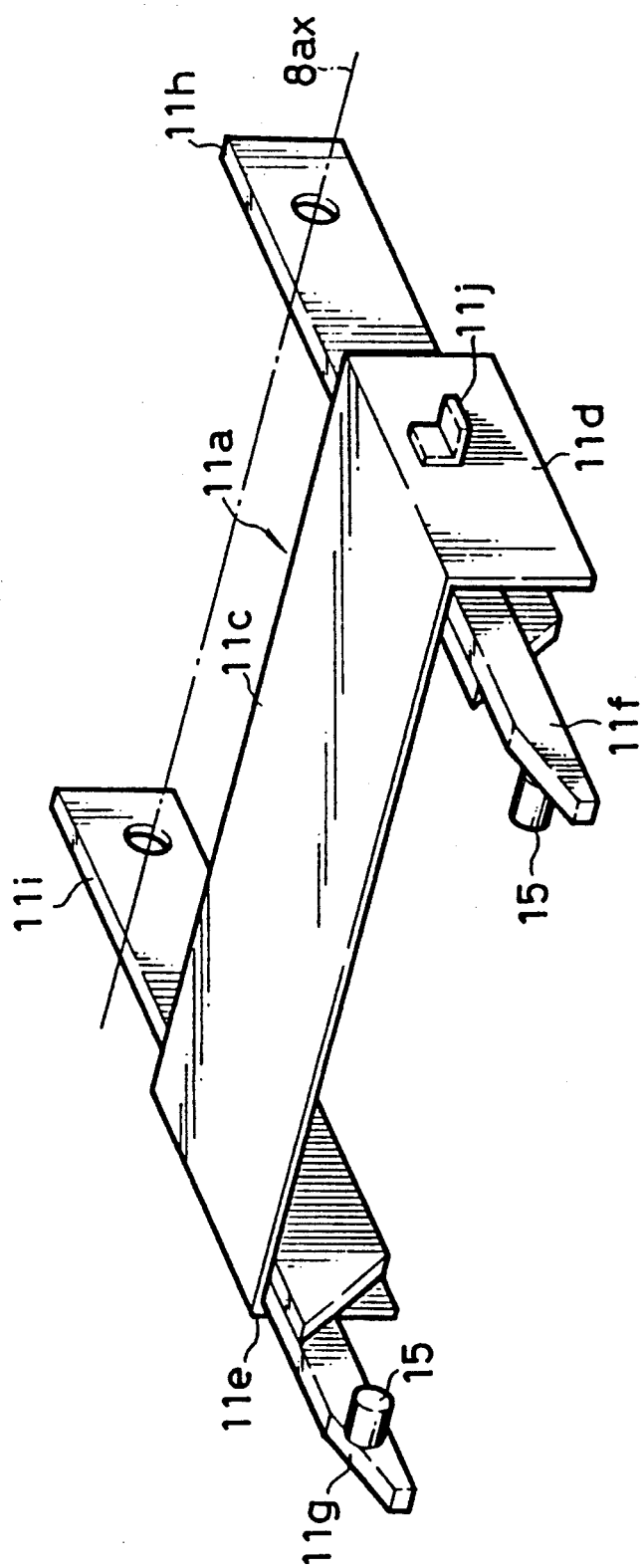
FIG. 4 is a perspective view showing part of the lower paper guide assembly.
Figure 5:
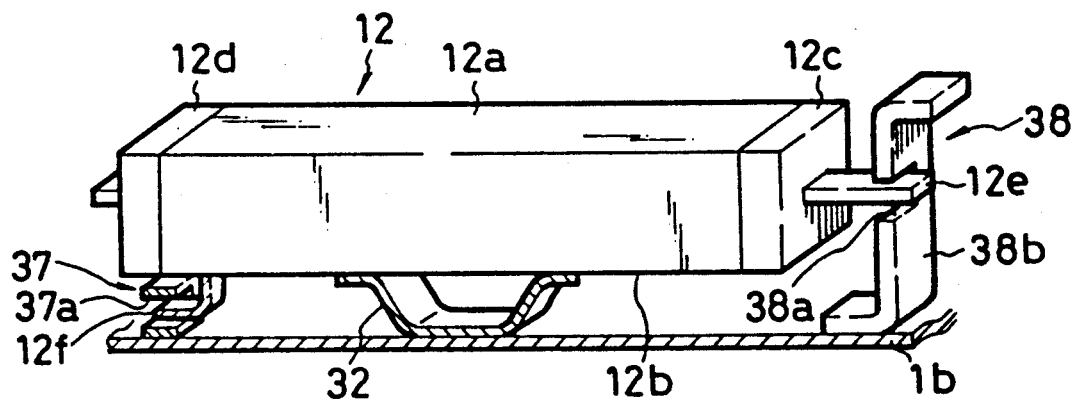
FIG. 5 is a perspective view showing the transfer charger.
Figure 6:
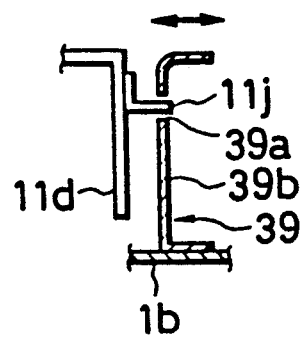
FIG. 6 is a sectional view showing engagement between a hook on the paper guide assembly and a perforation on a plate spring fixed to the lower cover.

Referring first to FIG. 1 and FIG. 2, when the upper cover 1a is closed, it is latched by a latch mechanism 50. The latch mechanism comprises a hooked lever 51 which is pivotably supported at a pivot axis 51b by the upper cover 1a and has a hook 51a, and a notch 52 which is formed in the lower cover 1b and with which the hook 51a of the hooked lever 51 is engageable. A tension spring 53 has one end fixed to the upper cover 1a and the other end connected to the lever 51 on the opposite side to the hook 51a with respect to the pivot axis 51b thereby to provide a biasing force to keep the engagement between the hook 51a and the notch 52 once the engagement is established. To release the engagement for opening the upper cover 1a, a press button 54 extending through the upper cover 1a is pressed. Then, the upper cover 1a is lifted by a spring 55 at the pivot shaft 1c.

The electrophotography system 40 comprises a photosensitive drum 41, which is rotatably mounted to the upper cover 1a, and rotates in a direction indicated by arrow Rp. During the rotation its cylindrical surface 41a having a photosensitive layer successively passes by a charger 42, an exposure device 43, a developer 44, a transfer charger 12, a cleaning device 46 and a discharger 47.

The charger 42 uniformly charges the cylindrical surface 41a of the photosensitive drum 41.

The exposure device 43 exposes the cylindrical surface 41a of the photosensitive drum 41 to a pattern of light, thereby forming an electrostatic latent image on the surface of the photosensitive drum 41.

The developer 44 forms a toner image corresponding to the electrostatic latent image on the cylindrical surface 41a of the photosensitive drum 41.

The location where the transfer charger 12 faces the photosensitive drum 41 forms a transfer section 45. At the transfer section 45, recording paper 2 is brought into contact with the cylindrical surface 41a of the photosensitive drum 41, and the toner image is transferred from the photosensitive drum 41 to the recording paper 2.

The transfer charger may comprise a corona charger which applies electrostatic charges (of a polarity opposite to the polarity of the charges forming the electrostatic latent image) to the recording paper 2 by corona discharge, and thereby attracts the toner image on the photosensitive drum 41 to the recording paper 2.

The cleaning device 46 removes any residual toner from the photosensitive drum 41. The discharger 47 removes any residual electrostatic charge from the photosensitive drum 41.

The paper feed system 30 comprises a paper cassette 3, which is removably mounted to the lower cover 1b, and accommodates recording paper 2 consisting of a stack of cut sheets.

A pick-up roller 7 picks up the recording paper 2 one sheet at a time from the cassette 3.

The recording paper 2 that has been picked up is conveyed through the conveyance path to the transfer section 45. Provided by the conveyance path are guide plates 22a and 22b, a turn roller 18, an auxiliary roller 19, movable guide plates 10a and 10b, a fixed guide plate 23, register rollers 8a, 8b, and a paper guide assembly 11.

The auxiliary roller 19 is pressed against the turn roller 18 by means of a movable guide plate 20, and as the turn roller 18 rotates, it drives the auxiliary roller 19; thereby to feed the recording paper 2 having reached the turn roller 18, to the register rollers 8a and 8b.

The register rollers 8a and 8b are mounted on the lower cover 1b. The register roller 8b is pressed against the register roller 8a so that they pinch the recording paper 2 between them with a high pressure, to feed the recording paper 2, while ensuring that the recording paper 2 is moved forward at a speed identical to the peripheral speed of the photosensitive drum 41.

The paper guide assembly 11 guides the recording paper 2 having passed the register rollers 8a and 8b to the transfer section 45. For this purpose, an entrance part of the paper guide assembly 11, through which the recording paper 2 having passed the register rollers 8a and 8b enters, is near and in alignment with the gap between the register rollers 8a and 8b. An exit part of the paper guide assembly 11, through which the recording paper 2 is fed from the paper guide assembly 11 to the transfer section 45, is in alignment with the transfer section 45 and, in particular, with the gap between the cylindrical surface 41a of the photosensitive drum 41 and the transfer charger 12.

At the transfer section 45, the recording paper 2 is brought into contact with the cylindrical surface 41a of the photosensitive drum 41.

The recording paper 2 onto which the toner image has been transferred is separated from the photosensitive drum 41, and is then passed to a fixing device 16, where the toner image is fixed.

The paper guide assembly 11 of this embodiment comprises a lower guide plate 11a having a substantially flat, horizontal part 11c extending in the direction of the paper transport and a pair of vertical parts 11d and 11e extending vertically from respective edges of the horizontal part 11c, and an upper guide plate 11b fixed to the lower guide plate 11a. A transport path for the recording paper 2 is formed between lower and upper guide plates 11a and 11b. The ends of the guide plates 11a and 11b near the register rollers 8a and 8b are adjacent to each other and form the entrance part of the paper guide assembly 11. The opposite ends of the guide plates 11a and 11b are also adjacent to each other and form the exit part of the paper guide assembly 11.

A pair of rod-shaped transfer charger pressing members 11f and 11g extend along the respective edges of the horizontal part 11c of the lower guide plate 11a. A pair of arms 11h and 11i extend along and parallel to the pressing members 11f and 11g, and are joined with the pressing members 11f and 11g. A hook 11j is fixed to the vertical part 11d.

The lower guide plate 11a is fixed by screws to the pressing members 11f and 11g, which in turn are fixed to the arms 11h and 11i. One end of each of the arms 11h and 11i is pivotably supported at the axis 8ax of the register roller 8a, so that the entire paper guide assembly 11 is rotatable about the axis 8ax of the register roller 8a.

The pressing members 11f and 11g are disposed so as to abut on the upper surface 12a at first and second ends 12c and 12d of the transfer charger 12.

The hook 11j is engageable with a perforation 39a (FIG. 6) in a vertically extending portion 39b of a plate spring 39 fixed to the lower cover 1b. This engagement is attained when the paper guide assembly 11 is pressed downward from above. By virtue of this engagement, the paper guide assembly 11 is protected from undesirable disengagement. The engagement is released by pulling the plate spring 39 laterally outward (to the right in FIG. 6).

The transfer charger 12 is mounted on the lower cover 1b. Specifically, it is resiliently supported by a plate spring 32 interposed between the lower surface 12b of the transfer charger 12 and the lower cover 1b to provide a biasing force to push the transfer charger 12 in an upward direction.

The transfer charger 12 is protected from undesirable detachment by means of a hook 12e fixed to the first end 12c, which engages a perforation 38a in a vertical part 38b of a plate spring 38 fixed to the lower cover 1b. The transfer charger 12 also has a hook 12f, on the bottom surface 12b near the second end 12d, which engages a perforation 37a of an engagement member 37 fixed to the lower cover 1b.

Support rollers 15 are provided on the pressing members 11f and 11g, at locations adjacent the cylindrical surface 41a of the photosensitive drum 41 and extend inwardly from the inner surfaces of the pressing members 11f and 11g. The support rollers 15 are engageable with the cylindrical surface 41a at the axial ends of the photosensitive drum 41.

The support rollers 15 are short in the direction of the axis of the photosensitive drum 41 and engage the ends of the cylindrical surface 41a outside the area in which the image is formed, so that they do not damage the image and do not obstruct the transfer of the toner image.

When the upper cover 1a is open, the support rollers 15 are not in abutment with the photosensitive drum 41, so the paper guide assembly 11 is free to be rotated upwardly about the axis of the register roller 8a. The transfer charger 12 is lifted by the plate spring 32 to the height determined by the lifting force of the plate spring 32, the weight of the transfer charger 12 and the moment of the paper guide assembly 11.

When the upper cover 1a is closed, the photosensitive drum 41 is brought into contact with the support rollers 15 mounted on the paper guide assembly 11, which pushes down down the transfer charger 12. Because the transfer charger 12 is supported by the plate spring 32 (which thereby gives an upward force), the transfer charger 12 is pressed down resiliently by the photosensitive drum 41, and the gap between the cylindrical surface 41a of the photosensitive drum 41 and the transfer charger 12 is maintained constant. Moreover, the paper guide assembly 11 and the transfer charger 12 are engaged (by abutment between the pressing members 11f and 11g and the upper surface 12a of the transfer charger 12) with each other, so the alignment between the paper guide assembly 11 (in particular its exit part) and the gap between the cylindrical surface 41a of the photosensitive drum 41 and the transfer charger 12 is ensured.

Since the paper guide assembly 11 is rotatable about the axis 8ax of the register roller 8a, the entrance part of the paper guide assembly 11 is kept in alignment with the gap between the register rollers 8a and 8b, so the paper feeding is achieved without trouble.

Figure 7:
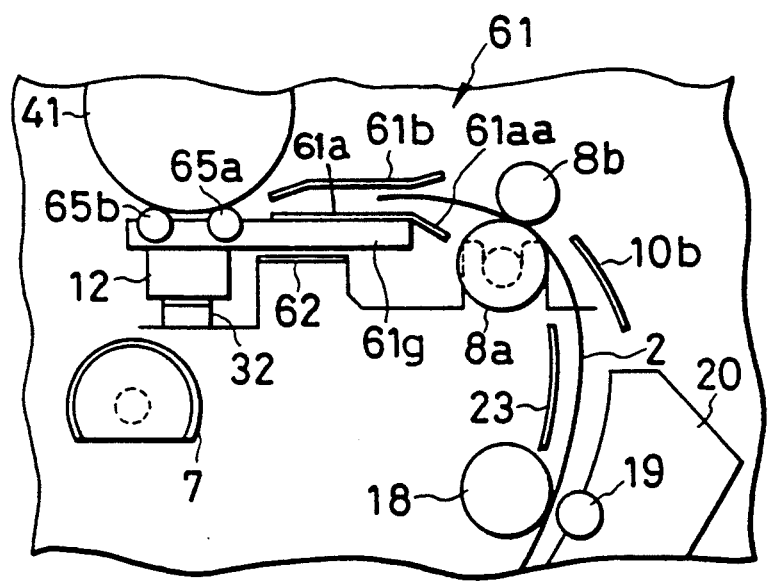
FIG. 7 is a sectional view showing a pertinent part of the recording device of another embodiment of the invention.

FIG. 7 shows another embodiment of the invention. In this embodiment, a paper guide assembly 61 used in place of the paper guide assembly 11 of the embodiment of FIG. 1 to FIG. 6, comprises a lower guide plate 61a which is similar to the lower guide plate 11a but is provided with an inclined entrance part 61aa, an upper guide plate 61b similar to the upper guide plate 11b, a pair of transfer charger pressing members 61g, and support rollers 65a and 65b. Only one pair of support rollers 65a and 65b which engage the cylindrical surface 41a at one end of the photosensitive drum 41 are shown, but another pair of support rollers are also provided to engage the cylindrical surface 41a at the other end of the photosensitive drum 41. The pressing members 61g abut on the upper surfaces at the respective ends of the transfer charger 12, which is resiliently supported by the spring 32. The pressing members 61g of this embodiment are also engageable, at their parts near the entrance part of the paper guide assembly, with a supporting table 62.

When the upper cover 1a is open, the paper guide assembly 61 is supported by engagement of the pressing members 61g with the supporting table 62 as well as the abutment of the pressing members 61g with the transfer charger 12.

When the upper cover 1a is closed, the respective ends of the photosensitive drum 41 are caused to abut on the pair of the support rollers 65a and 65b at different positions along the circumference of the photosensitive drum 41, while the transfer charger 12 is resiliently supported by the plate spring 32. As a result, the paper guide assembly 61 is held at such a position that the support rollers 65a and 65b are pressed against the photosensitive drum 41, and floats from the supporting table 62.

The gap between the photosensitive drum 41 and the transfer charger 12 is thus maintained constant. Moreover, the alignment between the exit part of the paper guide assembly 61 and the gap between the photosensitive drum 41 and the transfer charger 12 is maintained constant.

The relative position between the entrance part of the paper guide assembly 61 and the gap between the register rollers 8a and 8b is changed a little in accordance with the movement of the paper guide assembly 61, e.g., if the position at which the photosensitive drum differs from the designed position, the photosensitive drum is eccentric, or the photosensitive drum has any surface irregularity or undulation. But the alignment at the entrance part of the paper guide assembly need not be so accurate as at the exit part, because what is required at the entrance part is to ensure that the recording paper be introduced into the space between the guide plates. Even if there is a small misalignment, the recording paper can be led into the space between the guide plates, without causing paper jamming. Moreover, the provision of the expanded entrance part 61aa further alleviates the requirement of the alignment.

Although the invention has been described with reference to specific embodiments, various modifications can be made without departing from the scope of the invention.

The invention is not limited to a facsmile machine, but is it also applicable to other recording devices such as a printer and a copier.

As has been described, according to the invention, the paper guide assembly has a member pressing the transfer charger with support rollers in contact with the surface of the photosensitive drum, and the transfer charger is resiliently pushed toward the photosensitive drum, so the gap between the photosensitive drum and the transfer charger is maintained constant. Also, the relative position between the exit part of the paper guide assembly, and the photosensitive drum and the transfer charger is maintained constant. Accordingly, satisfactory transfer of toner image is ensured. Moreover the structure is not complicated, and the cost of the device is not expensive.

What is claimed is:

1. A recording device comprising:
   a housing comprised of a lower cover and an upper cover pivotable with respect to the lower cover for opening to permit access to an interior of the housing, and closing to prevent access to the interior of the housing;
   a photosensitive drum, having a cylindrical surface, being mounted to the upper cover;
   a transfer charger being mounted to the lower cover;
   a transfer section disposed between said photosensitive drum and said transfer charger when said upper cover is closed relative to said lower cover;
   a paper guide assembly having one part adjacent the transfer section for guiding recording paper to the transfer section;

a plurality of support rollers rotatably mounted on said one part of the paper guide assembly so as to be engageable with axial ends of the photosensitive drum;

the paper guide assembly including means for engaging the transfer charger so that as the paper guide assembly is pressed by the photosensitive drum through contact of the plurality of rollers, the transfer charger is pressed by the paper guide assembly;

means for resiliently pressing the transfer charger toward the photosensitive drum;

whereby when the upper cover is closed the photosensitive drum is caused to abut on the plurality of support rollers, and a gap formed between the cylindrical surface of the photosensitive drum and the transfer charger is determined by abutment of the support rollers on the cylindrical surface of the photosensitive drum.

2. The device of claim 1, further comprising a register roller mounted to the lower cover for feeding the recording paper;

said paper guide assembly having one end adjacent the register roller so that the recording paper fed past the register roller is guided by the paper guide assembly.

3. The device of claim 1, wherein said paper guide assembly is rotatable about the register roller.

4. The device of claim 1, wherein said plurality of rollers comprises a pair of rollers provided for each end of the photosensitive drum;

whereby each end of the photosensitive drum abuts on the pair of rollers at different positions along its circumference, thereby maintaining a constant relative position between the paper guide assembly, the photosensitive drum, and the transfer charger.

5. The device of claim 1, wherein said paper guide assembly comprises a first guide plate and a second guide plate, a path for the recording paper being formed between said first and second guide plates.

6. The device of claim 5, further comprising a rod-shaped transfer charger pressing member extending along edges of the first guide plate, wherein said plurality of support rollers are mounted to the rod-shaped transfer charger pressing member.

7. The device of claim 1, wherein said resiliently pressing means is a compression spring having one end engaged with the lower cover.

8. A recording device comprising:

a housing comprised of a lower cover and an upper cover, the upper cover being pivotable with respect to the lower cover for opening the housing to permit access to an interior of the housing, and for closing the housing to prevent access to the interior;

a photosensitive drum mounted to the upper cover;

a transfer charger mounted to the lower cover;

a transfer section disposed between said photosensitive drum and said transfer charger;

a register roller mounted to the lower cover for feeding recording paper toward the transfer section;

a paper guide assembly having one part adjacent the transfer section for guiding the recording paper to the transfer section, and having another part adjacent the register roller for receiving the recording paper fed by the register roller;

means for rotating the paper guide assembly about an axis of the register roller so that the axis corresponds to a center of such rotation;

a plurality of support rollers rotatably mounted on said one part of the paper guide assembly so as to be engageable with axial ends of the photosensitive drum;

said transfer charger being movable together with the paper guide assembly so that when the photosensitive drum presses against the plurality of rollers on the paper guide assembly, the transfer charger is pressed by the paper guide assembly;

means for resiliently biasing the transfer charger toward the photosensitive drum;

whereby when the upper cover is open the resilient biasing means presses the transfer charger against the paper guide assembly causing the paper guide assembly to rotate about the axis of the register roller, and when the upper cover is closed the photosensitive drum is caused to abut the plurality of support rollers forming a gap between a cylindrical surface of the photosensitive drum and the transfer charger, with said gap being determined by said abutment of the support rollers on the cylindrical surface of the photosensitive drum.

* * * * *

UNITED STATES PATENT AND TRADEMARK OFFICE
CERTIFICATE OF CORRECTION

PATENT NO. : 5,189,469
DATED : February 23, 1993
INVENTOR(S) : Yuji ENDO

It is certified that error appears in the above-identified patent and that said Letters Patent is hereby corrected as shown below:

Col. 3, line 50, ";" should be --.--

Col. 3, line 65, delete ","

Signed and Sealed this

First Day of March, 1994

Attest:

BRUCE LEHMAN

Attesting Officer  Commissioner of Patents and Trademarks